(12) United States Patent
Heo et al.

(10) Patent No.: US 9,343,726 B2
(45) Date of Patent: May 17, 2016

(54) RECHARGEABLE BATTERY

(75) Inventors: Sang-Heon Heo, Yongin-si (KR); Jinpil Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1129 days.

(21) Appl. No.: 13/325,341

(22) Filed: Dec. 14, 2011

(65) Prior Publication Data

US 2012/0171555 A1 Jul. 5, 2012

Related U.S. Application Data

(60) Provisional application No. 61/428,566, filed on Dec. 30, 2010.

(51) Int. Cl.
*H01M 2/26* (2006.01)

(52) U.S. Cl.
CPC .............. *H01M 2/263* (2013.01); *H01M 2/266* (2013.01)

(58) Field of Classification Search
CPC ........ H01M 2/26; H01M 2/263; H01M 2/266
USPC .................................. 429/161; 228/256, 170
See application file for complete search history.

(56) References Cited

U.S. PATENT DOCUMENTS

| 2,973,304 | A | 4/1961 | Cox |
| 5,415,954 | A | 5/1995 | Gauthier et al. |
| 7,976,979 | B2 | 7/2011 | Kozuki et al. |
| 2005/0260489 | A1 * | 11/2005 | Kim ............................... 429/122 |
| 2007/0009790 | A1 * | 1/2007 | Vutetakis et al. ............. 429/160 |
| 2009/0029259 | A1 | 1/2009 | Okazaki et al. |
| 2010/0104945 | A1 * | 4/2010 | Kozuki et al. ................. 429/246 |

FOREIGN PATENT DOCUMENTS

| CN | 101636858 A | 1/2010 | |
| EP | 1096582 | 5/2001 | |
| JP | EP 1096582 A1 * | 5/2001 | ............ H01M 2/266 |
| JP | 2001-283895 | 10/2001 | |
| JP | 2005-142026 | 6/2005 | |
| JP | 2009-123440 | 6/2009 | |
| KR | 10-2005-0104622 | 11/2005 | |
| KR | 10-2006-0022358 | 3/2006 | |
| KR | 10-2008-0095612 | 10/2008 | |
| KR | 10-2009-0045388 | 5/2009 | |

OTHER PUBLICATIONS

EP Examination Report dated Jul. 17, 2013 for European Patent Application No. EP 11 193 724.9 which claims priority from U.S. Appl. No. 61/428,566, filed Dec. 30, 2010; and captioned U.S. Appl. No. 13/325,341.

(Continued)

*Primary Examiner* — Karie O'Neill Apicella
(74) *Attorney, Agent, or Firm* — Knobbe Martens Olson & Bear LLP

(57) ABSTRACT

A rechargeable battery comprises an electrode assembly comprising a plurality of electrodes, wherein each of the plurality of electrodes comprises a coated region and an uncoated region; a case housing the electrode assembly; a cap plate coupled to the case for enclosing the electrode assembly in the case; a current collection plate coupled to the cap plate; and a connecting member electrically connected to the uncoated regions of at least two electrodes.

11 Claims, 5 Drawing Sheets

(56) References Cited

OTHER PUBLICATIONS

Extended European Search Report dated Nov. 19, 2012 for corresponding EP Application No. 11193724.9.
European Search Report dated Apr. 16, 2012 for corresponding EP Application No. 11193724.9.
Office Action issued on Jan. 27, 2015 for Chinese Patent Application No. 201110448686.7.
Office Action issued on Oct. 10, 2015 for Chinese Patent Application No. 201110448686.7.

* cited by examiner

RECHARGEABLE BATTERY

RELATED APPLICATIONS

This application claims the benefit of U.S. Provisional Patent Application No. 61/428,566, filed on Dec. 30, 2010, with the United States Patent and Trademark Office, the disclosure of which is incorporated herein in its entirety by reference.

BACKGROUND

1. Field

The described technology relates generally to a rechargeable battery having an electrode assembly and a current collecting plate connected to each other through a welding structure.

2. Description of the Related Technology

A rechargeable battery typically includes an electrode assembly, a case for housing the electrode assembly, a cap plate for opening and closing an opening of the case, a current collecting plate connected to an uncoated region of the electrode assembly, and an electrode terminal electrically connected to the current collecting plate and protruded to the outside of the cap plate. The electrode assembly typically includes a separator and positive and negative electrodes disposed on both sides of the separator, which are spirally wounded in a jelly-roll shape.

The uncoated region and the current collecting plate are typically mechanically and electrically connected to each other through welding. For example, an uncoated region is typically laid over a current collecting plate, and the uncoated region is typically welded to the current collecting plate by applying ultrasonic wave vibration in an ultrasonic welding method. If a width of the uncoated region is narrow, it is difficult to join the uncoated regions between a horn and an anvil of an ultrasonic welder.

In a laser welding method, a protrusion member of a current collecting plate is typically stood vertically on the uncoated region, and the protrusion member is typically welded to the uncoated region by radiating a laser beam. However, it is difficult to ensure that the uncoated region is uniformly adhered to the current collecting plate.

In laser welding, a slit is formed at the current collecting plate, and the uncoated region is inserted into the slit. Even in this case, it is also difficult to join the uncoated regions when a width of the uncoated region is narrow, and the separator may be damaged because the laser beam penetrates through the electrode assembly after passing through the uncoated region.

In order to improve welding performance, a contact area of the current collecting plate and the uncoated region can be widened by bending a predetermined part of the uncoated region. In this case, it is difficult to bend the uncoated region with a constant width. Further, it is difficult to spirally wind the bended positive electrode or the bended negative electrode.

The information disclosed in this section is only for enhancement of understanding of the background of the described technology and therefore may contain information that does not form the prior art that is already known in this country to a person of ordinary skill in the art.

SUMMARY

One embodiment provides a rechargeable battery including an electrode assembly comprising a plurality of electrodes, wherein each of the plurality of electrodes comprises a coated region and an uncoated region; a case housing the electrode assembly; a cap plate coupled to the case for enclosing the electrode assembly in the case; a current collection plate coupled to the cap plate; and a connecting member electrically connected to the uncoated regions of at least two electrodes.

DETAILED DESCRIPTION

Figure 1:
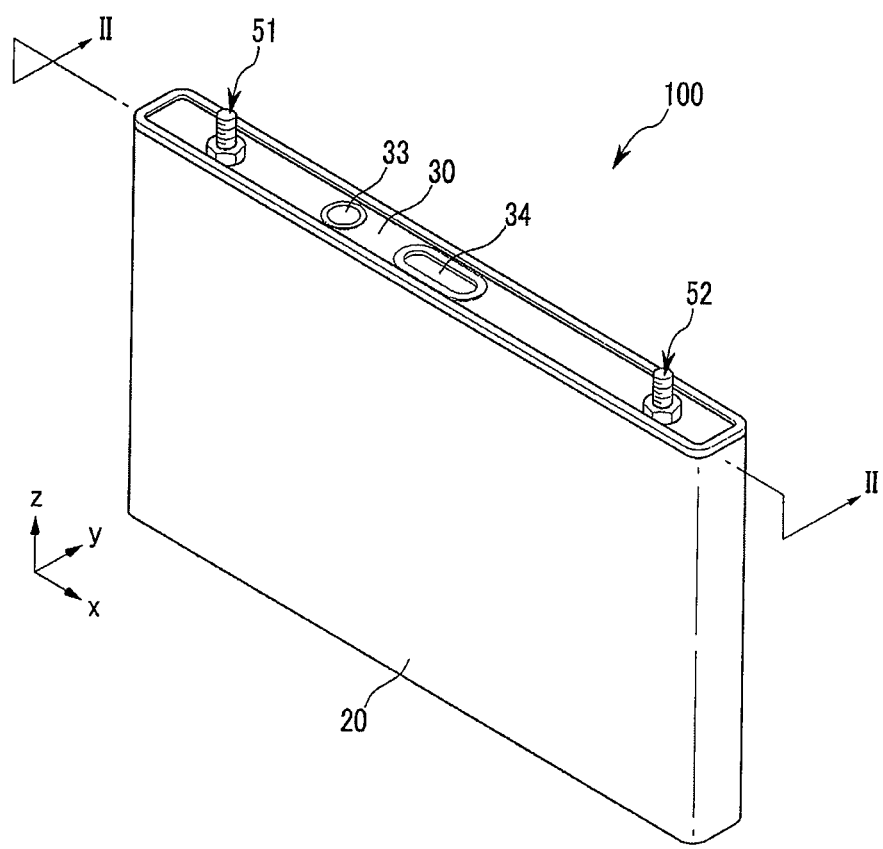
FIG. 1 is a perspective view of a rechargeable battery according to a first embodiment of the present invention.

Embodiments of the present invention will be described more fully hereinafter with reference to the accompanying drawings, in which certain embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
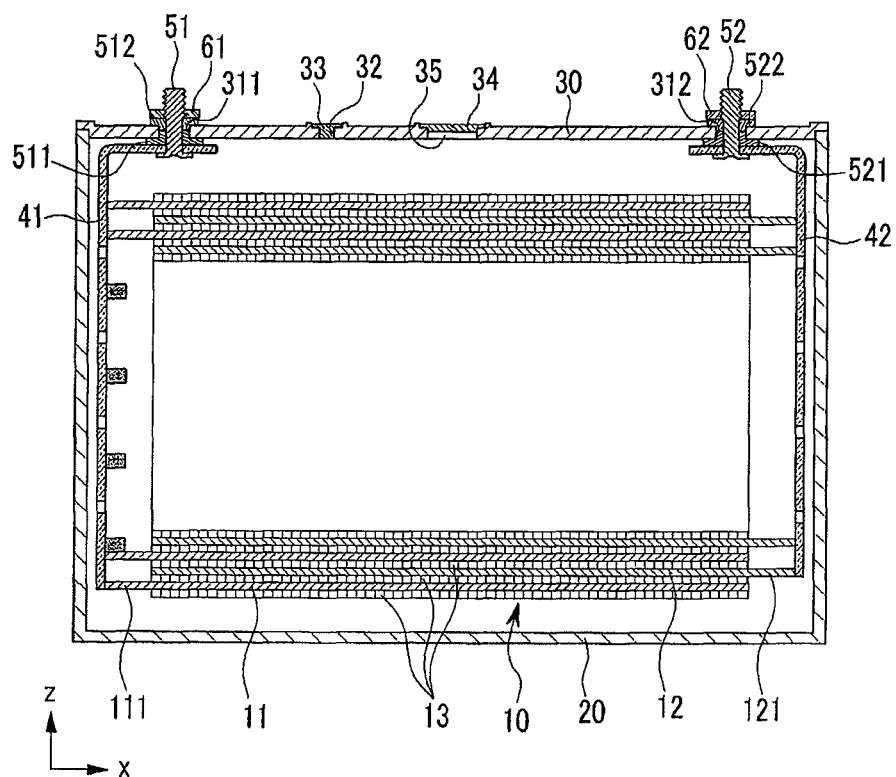
FIG. 2 is a cross-sectional view of FIG. 1 taken along the line II-II.

FIG. 1 is a perspective view of a rechargeable battery according to a first embodiment of the present invention. FIG. 2 is a cross-sectional view of FIG. 1 taken along the line II-II. Referring to FIG. 1 and FIG. 2, a rechargeable battery 100 may include a case 20 for housing an electrode assembly 10, a cap plate 30 connected to an opening formed at one side of the case 20 for closing and opening the case 20, current collecting plates 41 and 42 electrically connected to the electrode assembly 10, and electrode terminals 51 and 52 connected to the current collecting plates 41 and 42 and penetrating the cap plate 30.

For example, the electrode assembly 10 may include a separator 13 as an insulator and negative and positive electrodes 11 and 12 disposed at both sides of the separator 13. The electrode assembly 10 may have a jelly roll shape formed by spirally winding the negative electrode 11 and the positive electrode 12 with the separator 13. Further, the electrode assembly may be formed by stacking the negative electrode and the positive electrode with the separator interleaved therebetween although it is not shown. Here, the negative and positive electrodes are a single metal plate. Further, the electrode assembly may be formed by folding the negative electrode, the separator, and the positive electrode in a zigzag manner (not shown).

The negative electrode 11 and the positive electrode 12 may be formed by coating a current collector with an active material. Here, the current collector may be a thin metal plate. Therefore, the negative electrode 11 and the positive electrode 12 may be divided into a coating region where the current collector is coated with the active material, and uncoated regions 111 and 121 where the current collector is not coated with the active material. The coating region may occupy almost the entire area of the negative electrode 11 and the positive electrode 12. The uncoated regions 111 and 121 may be formed at both sides of the coating region of the electrode assembly 10 in the jelly-roll state. For example, the current collector of the negative electrode 11 may be made of copper, and the current collector of the positive electrode 12 may be made of aluminum.

The case 20 forms an exterior of the rechargeable battery 100. The case 20 may be made of conductive metal such as aluminum, aluminum alloy, or nickel-plated steel. The case 20 can provide a space for housing the electrode assembly 10. For example, the case 20 may be formed in a cuboid shape including an opening at one end thereof for housing the electrode assembly 10 that also has a cuboid shape. As shown in FIG. 1 and FIG. 2, the opening faces upwardly (z-axis direction)

The cap plate 30 may be formed of a thin plate and connected to the opening. Accordingly, the cap plate 30 can close and seal the case 20. Such a cap plate 30 may include elements for forming and driving the rechargeable battery 100 by blocking an inside and an outside of the case 20 from each other or connecting the inside and the outside according to needs. For example, the cap plate 30 may include terminal holes 311 and 312 penetrating the electrode terminals 51 and 52, an electrolyte injection opening 32 for injecting the electrolyte solution, and a vent hole 35 for securing the stability of the rechargeable battery 100.

The electrolyte injection opening 32 may be sealed with a sealing cap 33 after injecting the electrolyte solution inside the case with the cap plate 30 connected to the case 20. The vent hole 35 may be sealed with a vent plate 34 that maintains a closing state and opens the vent hole 35 when an internal pressure increases.

The electrode terminals 51 and 52 penetrating the terminal holes 311 and 321 are installed at the terminal holes 311 and 312. The electrode terminals 51 and 52 are electrically connected to the negative electrode 11 and the positive electrode 12 of the electrode assembly 10. The electrode terminals 51 and 52 may be installed with the insulators 511 and 521 interposed at inner sides of the terminal holes 311 and 312 and with gaskets 512 and 522 interposed at outer sides of the terminal holes 311 and 312. liquid injection device having an injection portion arranged to inject the molten metal at a corresponding location welded to the current collection plate 41 may be used. In the entire length L of the uncoated region 111, the connecting member 70 may be formed within a connecting member length L1 that does not intrude the coating regions 112 and 122, the separator 13, and the positive electrode 12. Therefore, the connecting member length L1 can widen a welding area of the current collecting plate 41, protect the coating regions 112 and 122 and the separator 13 from damage, and prevent the negative electrode 11 and the positive electrode 12 from short-circuit.

Since the connecting member 70 widens a contact area of the uncoated region 111 and the current collecting plate 41, the welding performance may be improved when the connecting member 70 of the electrode assembly 10 is welded to the current collecting plate 41 using a laser beam, Although the uncoated region 111 has low welding performance because it is made of copper, the connecting member 70 formed at the uncoated region 111 can improve the welding performance of the uncoated region 111 and the current collecting plate 41.

For example, the connecting member 70 may be formed with insert copper injected and then hardened between the space C of the uncoated region 111 and at the end of the uncoated region 111. That is, the connecting member 70 can include copper 71 in the molten state additionally provided and copper 72 in the molten state at the end of the uncoated region 111 melted by the molten copper 71. That is, the connecting member 70 may be integrally formed at the connecting member range L1 by the copper 71 and 72 that are made of the same material and molten and then hardened.

The connecting member 70 may be formed in a width direction (y-axis direction) at a predetermined gap setup for a height direction (z-axis direction) of the uncoated region 111. The current collecting plate 41 can closely adhere to and be welded to the uncoated region 111 corresponding to the connecting member 70. That is, the connecting member 70 can minimize the possibility of damaging the electrode assembly 10, which may be caused by the molten and then hardened copper 71 and 72 formed at a predetermined area including an area where the current collecting plate 41 is welded. The current collecting plate 41 may include a welding unit 411 corresponding to the connecting member 70 and a through-hole 412 not corresponding to the connecting member 70. Accordingly, the current The insulators 511 and 521 may electrically insulate the electrode terminals 51 and 52 and the cap plate 30. Further, the insulators 511 and 521 may further extend at the inside of the cap plate 30 between the current collecting plates 41 and 42 and the cap plate 30, thereby electrically insulating the current collecting plates 41 and 42 and the cap plate 30. The gaskets 512 and 522 may form a sealing structure between the electrode terminals 51 and 52 and the terminal holes 311 and 312 by assembling the electrode terminals 51 and 51 with nuts 61 and 62.

The current collecting plates 41 and 42 may electrically connect the electrode assembly 10 and the electrode terminals 51 and 52. For example, the current collecting plates 41 and 42 may be electrically connected to the electrode terminals 51 and 52 by caulking or riveting the electrode terminals 51 and 52 installed at the terminal holes 311 and 312 from the inside of the cap plate 30. Further, the current collecting plates 41 and 42 may be connected to the uncoated regions 111 and 121 of the electrode assembly 10 through welding.

Since the connection structures of the uncoated regions 111 and 121 of the electrode assembly 10 and the current collecting plates 41 and 42 are identically formed at the negative electrode 11 and the positive electrode 12, the connection structure of the uncoated region 111 and the current collection plate 41 of the negative electrode 11 will be used as an example to describe the present invention, hereinafter.

Figure 3:
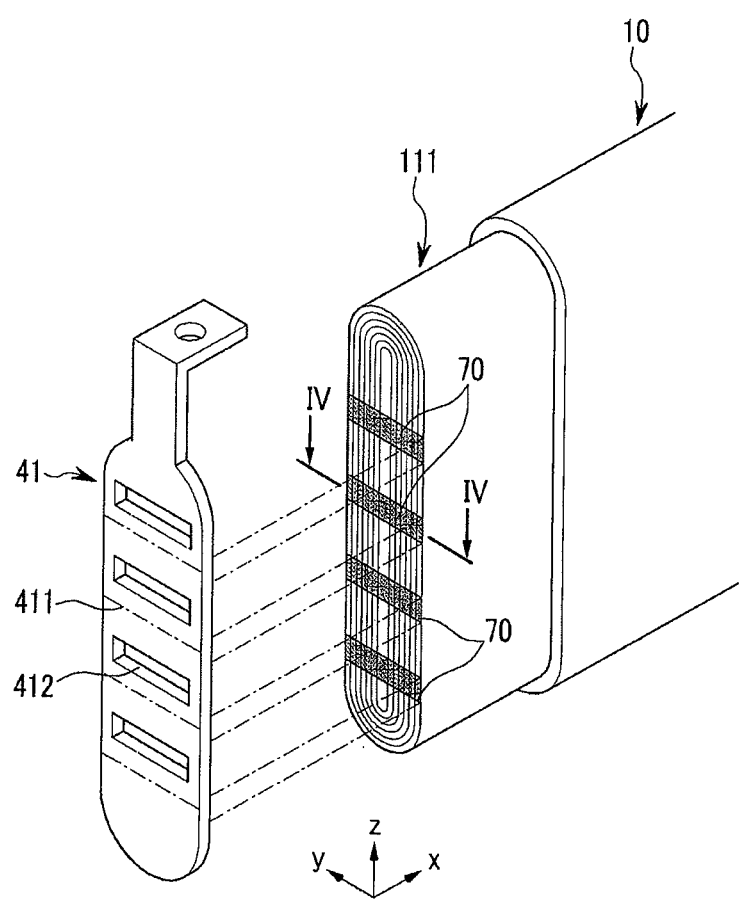
FIG. 3 is an exploded perspective view illustrating an electrode assembly and a current collecting plate.
Figure 4:
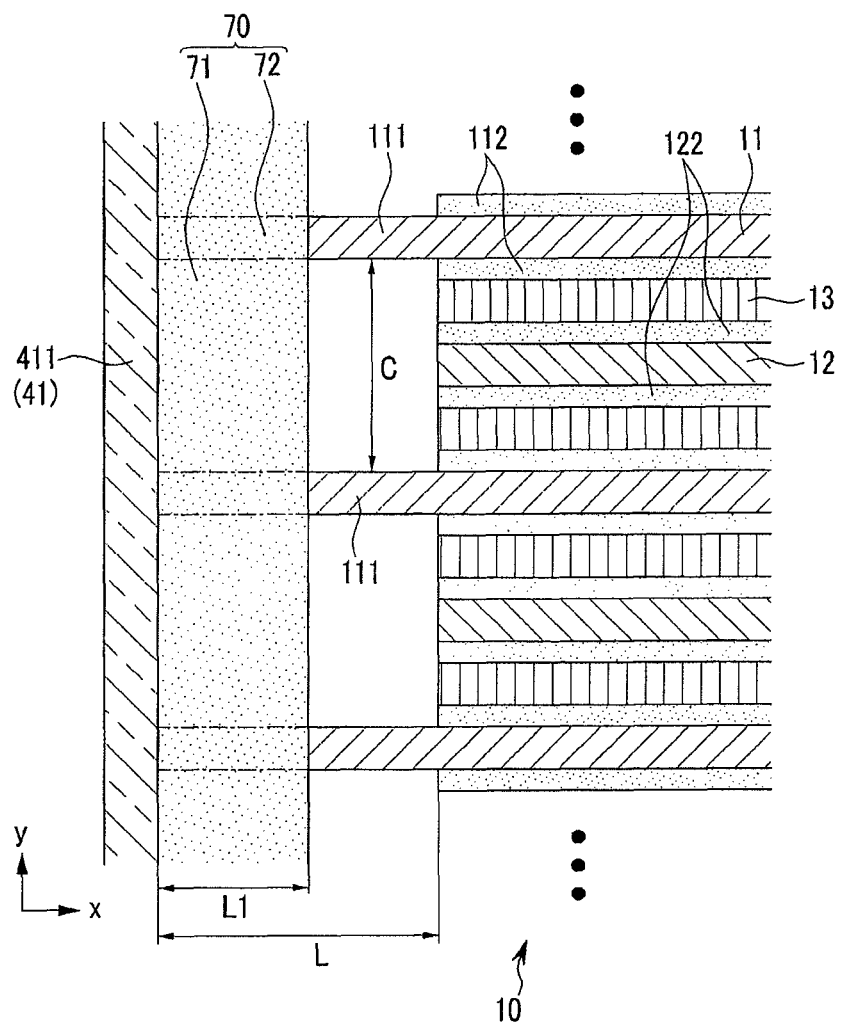
FIG. 4 is a cross-sectional view of FIG. 3 taken along the line IV-IV.

FIG. 3 is an exploded perspective view illustrating an electrode assembly and a current collecting plate. FIG. 4 is a cross-sectional view of FIG. 3 taken along the line IV-IV. Referring to FIG. 3 and FIG. 4, an empty space C may be formed between uncoated regions 111 in a spiral-wound electrode assembly 10. The electrode assembly 10 may include a connecting or reinforcing member 70 formed by interposing an insert metal that is formed by injecting and then hardening molten metal at the space C between the uncoated regions 111.

The inserted metal may form the connecting member 70 by partially injecting molten metal at a location corresponding to the uncoated region 111 to which the current collection plate 41 is to be connected and then hardening the molten metal. Further, the insert metal may form the connecting member 70 by partially soaking the uncoated region 111 in the molten metal and then hardening the molten metal. For this, a molten metal collecting plate 41 may minimize deformation caused by heat generated from welding and discharge a gas generated inside the electrode assembly during charging and discharging. That is, the through-hole 412 may be disposed alternately with the welding unit 411.

The connecting member may be formed corresponding to an entire area of a side of the uncoated region 111, which is setup as a height-width direction. In this case, the increment of an area of the connecting member in the uncoated region may make it further easier to weld the current collecting plate with the connecting member (not shown).

Also, the connecting member 70 may be formed by filling the space C between the uncoated regions 111 with the molten and then hardened copper 71. Accordingly, it may prevent a laser beam from penetrating the inside of the electrode assembly 10 during welding. That is, the connecting member 70 may protect the coating regions 112 and 122 and the separator 13 from damage caused by the laser beam.

Figure 5:
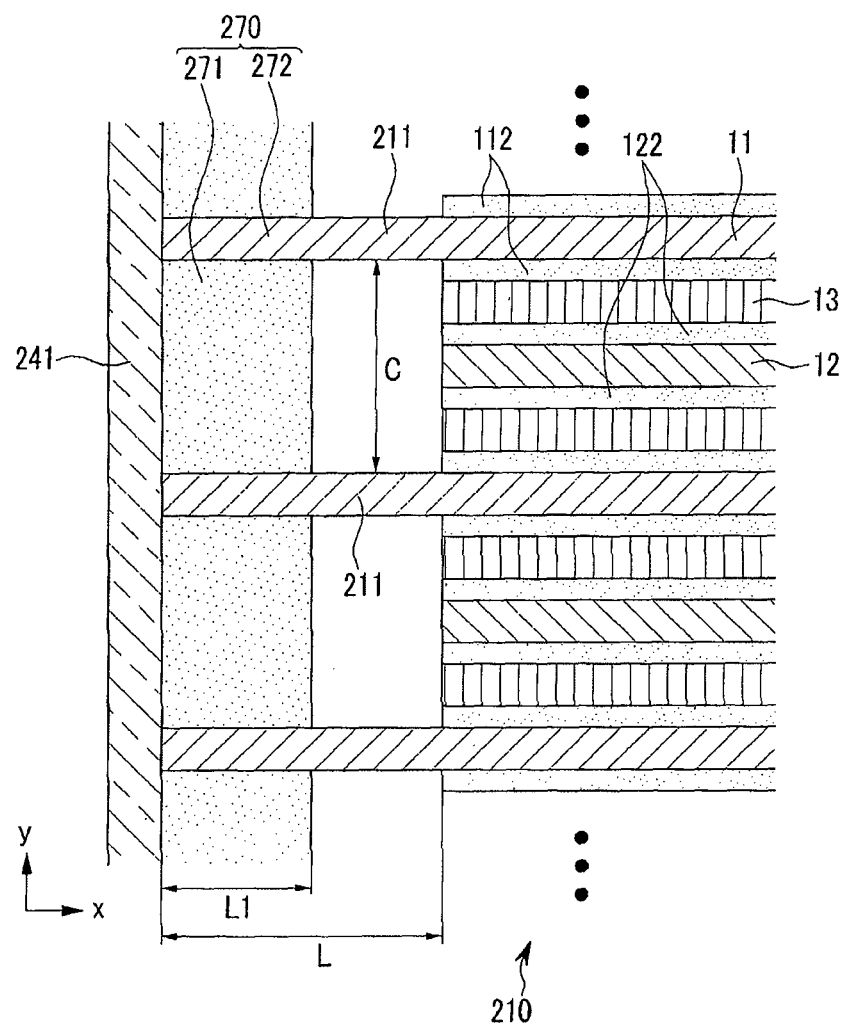
FIG. 5 is a cross-sectional view of an electrode assembly and a current collecting plate of a rechargeable battery according to a second embodiment of the present invention.

FIG. 5 is a cross-sectional view of an electrode assembly 210 and a current collecting plate 241 in a rechargeable battery according to a second embodiment of the present invention.

The connecting member 70 may be formed using molten copper having a melting point identical to that of the uncoated region 111 in the first described embodiment. Unlike the first embodiment, a connecting or reinforcing member 270 may be formed using insert aluminum having a melting point lower than that of an uncoated region 211 and molten and then hardened in the second described embodiment.

In the first described embodiment, the connecting member 70 is integrally formed at the end of the uncoated region 111 by the copper 71 and 72 molten and then hardened. Unlike the first embodiment, the connecting member 270 may be formed as a layered structure of copper formed at an end member 272 of the uncoated region 211 and the insert aluminum 271 interposed between the end members 272 of the uncoated region 211.

Since the insert aluminum 271 has a melting point lower than that of the copper, the connecting member 270 of the second described embodiment may reduce the possibility of damaging the uncoated region 211 more than the connecting member 70 of the first described embodiment. That is, the end member 272 sustains a shape thereof in the connecting member 270.

In detail, the connecting member 270 may form a connecting member length L1 that does not intrude the coating regions 112 and 122, the separator 13, and the positive electrode 12 in the entire length L of the uncoated region 211. Accordingly, the connecting member length L1 can widen a welding area of the current collecting plate 241, protect the coating regions 112 and 122, the separator 13, and the positive electrode 12 from damage caused by melting metal, and prevent the negative electrode 11 and the positive electrode 12 from short-circuit.

Since the connecting member 270 enlarges the contact area of the uncoated region 211 and the current collecting plate, welding performance is further improved when the connecting member 270 of the electrode assembly 210 is welded to the current collecting plate 241 using a laser beam. Although the uncoated region 211 has a low welding property because it is made of copper, the connecting member 270 formed at the uncoated region 211 can improve the welding performance of the uncoated region 211 and the current collecting plate 241.

For example, the connecting member 270 may include the end member 272 of the uncoated region 211 and insert aluminum 271 filling the space C of the uncoated region 211. That is, the connecting member 270 may be formed as a stacked structure of the insert aluminum 271 and the copper end member 272. That is, the connecting member 270 may be formed as a layered structure of the insert aluminum 271 and the copper end member 272 in the connecting member range L1.

Further, the connecting member 270 can prevent a laser beam from penetrating the inside the electrode assembly by filling the space C between the uncoated regions 211 with the insert aluminum 271. That is, the connecting member 270 can prevent the separator 13 from damaging which is caused by the laser beam.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery, comprising:
an electrode assembly comprising a plurality of electrodes, wherein each of the plurality of electrodes comprises a coated region and an uncoated region;
a case housing the electrode assembly;
a cap plate coupled to the case for enclosing the electrode assembly in the case;
a current collection plate coupled to the cap plate having a substantially planar surface, wherein the substantially planar surface of the current collection plate is directly physically connected to the uncoated regions of at least two electrodes; and
a connecting member electrically connected to the uncoated regions of at least two electrodes and formed adjacent to the substantially planar surface of the current collection plate, comprising portions of the uncoated region of the at least two electrodes and material that is interposed in a space between the uncoated regions of the at least two electrodes so as to define a substantially planar outer surface,
wherein the substantially planar surface of the current collection plate is connected to the substantially planar outer surface of the connecting member defined by the portions of the uncoated regions and the interposed material, so that the substantially planar outer surface of the connecting member is covered by the current collection plate.

2. The rechargeable battery of claim 1, wherein the connecting member is a metal electrically connected to the current collection plate.

3. The rechargeable battery of claim 2, wherein the connecting member further comprises portions of the uncoated region of the electrodes.

4. The rechargeable battery of claim 3, wherein the connecting member further comprises portions of the uncoated region of the electrodes in an integral structure comprising a single material.

5. The rechargeable battery of claim 3, wherein the connecting member further comprises portions of the uncoated region of the electrodes in a layered structure comprising two different materials.

6. The rechargeable battery of claim 4, wherein the material is copper or aluminum.

7. The rechargeable battery of claim 5, wherein the metal has a melting point lower than the melting point of the uncoated regions of the electrodes.

8. The rechargeable battery of claim 7, wherein the metal comprises aluminum and the uncoated regions of the electrodes comprise copper.

9. The rechargeable battery of claim 2, wherein the connecting member comprises a plurality of portions positioned along the current collection plate.

10. The rechargeable battery of claim 9, wherein the current collection plate comprises a plurality of apertures, each aperture positioned adjacent to a portion of the connecting member.

11. The rechargeable battery of claim 1, wherein the connecting member comprises a thickness that is less than the length of the uncoated regions of the electrodes between the current collection plate and the coated regions of the electrodes.

* * * * *